US012215645B2

(12) United States Patent
Grasreiner

(10) Patent No.: US 12,215,645 B2
(45) Date of Patent: Feb. 4, 2025

(54) REAL-TIME DETERMINATION OF A FRESH-AIR MASS IN A CYLINDER

(71) Applicant: Bayerische Motoren Werke Aktiengesellschaft, Munich (DE)

(72) Inventor: Sebastian Grasreiner, Miesbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/269,485

(22) PCT Filed: Jan. 12, 2022

(86) PCT No.: PCT/EP2022/050534
§ 371 (c)(1),
(2) Date: Jun. 23, 2023

(87) PCT Pub. No.: WO2022/161769
PCT Pub. Date: Aug. 4, 2022

(65) Prior Publication Data
US 2024/0084755 A1 Mar. 14, 2024

(30) Foreign Application Priority Data
Jan. 29, 2021 (DE) ..................... 10 2021 102 030.1

(51) Int. Cl.
*F02D 41/18* (2006.01)
*F02D 41/14* (2006.01)

(52) U.S. Cl.
CPC ......... *F02D 41/18* (2013.01); *F02D 41/1497* (2013.01); *F02D 2250/14* (2013.01)

(58) Field of Classification Search
CPC . Y02T 10/40; Y02T 10/12; F02D 2200/0402; F02D 41/18; F02D 41/182
(Continued)

(56) References Cited

U.S. PATENT DOCUMENTS

2003/0097214 A1* 5/2003 Gross ...................... F02D 28/00 701/115
2007/0174503 A1 7/2007 Konrad et al.
(Continued)

FOREIGN PATENT DOCUMENTS

CN 109211572 A * 1/2019
DE 199 48 663 C2 9/2002
(Continued)

OTHER PUBLICATIONS

International Search Report (PCT/ISA/210) issued in PCT Application No. PCT/EP2022/050534 dated Apr. 22, 2022 with English translation (5 pages).
(Continued)

*Primary Examiner* — George C Jin
*Assistant Examiner* — Teuta B Holbrook
(74) *Attorney, Agent, or Firm* — Crowell & Moring LLP

(57) ABSTRACT

Please substitute the new Abstract submitted herewith for the original Abstract: A method for determining a fresh-air-mass parameter in a cylinder of an internal combustion engine in a motor vehicle includes identifying a cylinder which is at the end of an intake stroke or at the beginning of a compression stroke during operation of the motor vehicle, determining a diagnosis time window which lasts for a period of time after closing of the inlet valves of the identified cylinder within a region of low torque of the internal combustion engine, ascertaining a development in the speed of the internal combustion engine during the diagnosis time window, and determining the fresh-air-mass parameter in the identified cylinder.

16 Claims, 6 Drawing Sheets

(58) Field of Classification Search
USPC .................... 123/22, 435, 480; 701/104, 102
See application file for complete search history.

(56) References Cited

U.S. PATENT DOCUMENTS

| | | | | |
|---|---|---|---|---|
| 2009/0235728 | A1 | 9/2009 | Sinnamon | |
| 2018/0113963 | A1* | 4/2018 | Kordon | G06F 30/20 |
| 2018/0347456 | A1* | 12/2018 | Magnusson | F02D 41/003 |
| 2018/0347496 | A1* | 12/2018 | Moine | F02D 41/182 |
| 2018/0363569 | A1* | 12/2018 | Finn | F02D 41/0025 |
| 2019/0257261 | A1* | 8/2019 | Surnilla | F02P 5/1506 |
| 2021/0065476 | A1 | 3/2021 | Grasreiner et al. | |

FOREIGN PATENT DOCUMENTS

| | | | | |
|---|---|---|---|---|
| DE | 10 2004 047 542 | A1 | | 4/2006 |
| DE | 10 2011 105 545 | A1 | | 12/2012 |
| DE | 10 2016 222 802 | A1 | | 5/2018 |
| DE | 10 2017 108 995 | B3 | | 6/2018 |
| DE | 10 2018 209 252 | A1 | | 12/2019 |
| DE | 10 2019 201 149 | A1 | | 7/2020 |
| EP | 0000899 | A1 | * | 3/1979 |
| JP | 3680599 | B2 | * | 8/2005 |
| JP | 2010502887 | A | * | 1/2010 |
| JP | 2018021453 | A | * | 2/2018 |

OTHER PUBLICATIONS

German-language Written Opinion (PCT/ISA/237) issued in PCT Application No. PCT/EP2022/050534 dated Apr. 22, 2022 (7 pages).
German-language Search Report issued in German Application No. 10 2021 102 030.1 dated Sep. 22, 2021 with partial English translation (13 pages).

* cited by examiner

REAL-TIME DETERMINATION OF A FRESH-AIR MASS IN A CYLINDER

FIELD

The invention relates to a method and a control means for determining a fresh-air mass parameter in a cylinder of an internal combustion engine, and to an internal combustion engine comprising such a control means.

BACKGROUND AND SUMMARY

Knowledge of the fresh-air mass in the combustion chamber of an internal combustion engine is of central importance for controlling the operating process. The air volume has an influence on the pressure curves that can be generated, the torque outputs (load), the raw emissions and thus directly on other control parameters such as fuel admixture, ignition timing, etc.

In addition, possibilities for predictive maintenance (also known as "health functions") are becoming increasingly important for internal combustion engines. These are intended to quantify the current performance status—and thus the maintenance requirement—in particular with regard to the required scope of maintenance and with regard to an advantageous time line.

A prerequisite for smooth and continuous engine running is the correct metering of a quantity of fuel to be injected in each operating state of the internal combustion engine. How much fuel must be injected to achieve the desired combustion ratio depends primarily on the mass of fresh air present in the combustion chamber of the cylinder for ignition, which in turn determines the mass of oxygen available for combustion.

For steady-state operations, air mass can be measured very well, for example, using flap mechanisms or hot-film air-mass meters.

In the range of transient, i.e. non-steady-state, processes at the engine, however, quantitative measurement of the air mass is difficult because, especially in the case of load changes, the sensor is located too far away from the location of the event on the one hand (sensor in the intake section, but statement of air trapping necessary in the combustion chamber), and on the other hand the sensor has a certain physical time constant until it delivers reliable values due to its thermal measurement principle (oscillation behavior, settling behavior, etc.).

In the transient operating range in particular, however, insufficiently accurate calculation of the air mass in the cylinder can result in increased emissions and, in extreme cases, irregular engine running and/or combustion misfires.

Against this background, it is the object of the invention to improve a determination of a fresh-air mass parameter in a cylinder of an internal combustion engine.

This object is achieved by a method having the features of claim 1, a control means having the features of claim 10, and an internal combustion engine having the features of claim 14. The dependent claims relate to advantageous developments of the invention.

According to one aspect, a method for determining a fresh-air mass parameter, in particular a relative fresh-air mass parameter, in a cylinder of an internal combustion engine in a motor vehicle is disclosed, comprising—in the stated or another sequence deemed expedient by a person skilled in the art—at least one, several or all of the following method steps:

(i) identifying a cylinder which is at the end of an intake stroke or at the beginning of a compression stroke during driving operation of the motor vehicle. The identification of this/these cylinder(s) can be carried out in particular by reading out existing information from an operating model, in particular the engine control system. An intake stroke means in particular the stroke of a cylinder in which the filling with fresh air for the following combustion is carried out and completed.

(ii) Determining a diagnosis time window which lasts for a period of time after a closing of the inlet valves of the identified cylinder within a low-torque range, in particular one of the strokes, of the internal combustion engine. The term "diagnosis time window" means, in particular, a continuous period of time as a portion of a compression stroke in the internal combustion engine (for example, one of the strokes of a four-stroke combustion in a four-stroke engine). A diagnosis time point is to be understood in particular as a time point within the diagnosis time window for which one, several or all of the determinants of a target variable to be determined are determined. In this context, a "low-torque range" means in particular a crank angle range in which the cylinder under consideration and/or several or all other cylinders of the engine do not make any contextually relevant contribution to a propulsive torque.

(iii) Determining a development in the speed of the internal combustion engine during the diagnosis time window, in particular with a real-time-capable sampling quality. In this context, a speed trend means in particular how a speed applied to the crankshaft of the internal combustion engine develops during the diagnosis time window. For this purpose, values for the speed with a high sampling frequency, for example in the range of one millisecond (ms) or faster, can be used between temporally adjacent values.

(iv) Determining a simplified cylinder load parameter in the identified cylinder in dependence on the determined development in the speed.

(v) According to one embodiment, determining the fresh-air mass parameter in the identified cylinder in dependence on the determined simplified cylinder load parameter.

The invention enables rapid control of the required fuel injection quantity within a few or even within one operating cycle, even in a transient (i.e. non-steady-state) operating state of the internal combustion engine.

Thus, even in a transient operating state of the internal combustion engine, the determination of the appropriate fuel injection quantity for a subsequent operating cycle of the diagnosed cylinder can be determined and injected with high feedforward control quality. In steady-state operating states, this is also easily possible with the conventional methods for determining the fresh-air mass parameter, because the amount of fuel to be injected usually does not change or changes only slightly from one operating cycle to the next.

The determination approach of starting from a high-resolution speed measurement, which can be universally evaluated in the same way again and again, makes the method easier to apply and/or more reusable across different applications than known models.

According to a further aspect, a control means for determining a fresh-air mass parameter, in particular a relative fresh-air mass parameter, in a cylinder of an internal combustion engine is disclosed, which is designed in particular in and/or as part of an engine control unit for an internal combustion engine of a passenger car. The control means is designed to transfer, in particular by means of a method in accordance with one embodiment of the invention, values of a fresh-air mass parameter which have been determined and/or stored in a memory (a) to a control component of the control means for real-time control of functions of the internal combustion engine in dependence on the transferred values of the fresh-air mass parameter, and/or
(b) to a diagnostic component of the control means for further onboard diagnostic functions.

According to one embodiment, the control means has a control component which is designed to determine and, in particular, inject a fuel injection quantity for a specific operating cycle of a cylinder in dependence on a determined value of the fresh-air mass parameter with respect to a previous, in particular the last previous, operating cycle of the identified cylinder or of a cylinder diagnosed directly beforehand, in particular most recently.

In particular, (I) either a specific cylinder can always be evaluated and its previously determined air mass can then be used in the new cycle to determine the fresh-air mass parameter, or (II) a cylinder can be evaluated with regard to its air mass and the value of the fresh-air mass parameter determined at that time and/or determined last can be transferred to the next firing cylinder for its feedforward control. The latter option (II) can be of particular interest for fast transient changes, in order to have only a short period of time between two known values of the fresh-air mass parameter.

According to one embodiment, the control means has a non-volatile memory and is designed to store one or more values of the fresh-air mass parameter determined at one or different diagnosis time points, in particular, in the memory.

According to one embodiment, the control means is arranged to transfer values of the fresh-air mass parameter stored in the memory to an offboard computer for offline diagnostic functions.

According to a further aspect, an internal combustion engine is disclosed having one or more cylinders, comprising a control means according to one embodiment of the invention.

The invention is based, inter alia, on the consideration that the known methods for determining the fresh-air mass (=load) in the cylinder are normally sufficient for steady-state operating situations.

The invention is further based, inter alia, on the consideration that the air mass in the combustion chamber cannot be determined directly, since the geometric arrangement and the cost restrictions of operation do not permit a corresponding sensor installation. Classically, measurement methods are used accordingly that either perform mass flow measurement "far away" from the location of the action in the cylinder (e.g., hot-film air-mass meter in the intake manifold) or estimate trapped air mass based on pressure and modeling. The problems with existing methods are that they are either too sluggish, do not directly consider the influence of air trapping on the combustion chamber, or require applications of sensor technology that are too expensive.

Furthermore, the invention is based, inter alia, on the consideration that known computational models for steady-state, transient operating cases are often very complex when they produce a result during the transient operating state that can be used to inject the desired amount of fuel based on a sufficiently accurate fresh-air mass.

The invention is now based, inter alia, on the idea of using the high-resolution recorded speed of the crankshaft as the basis for determining the fresh-air mass in the cylinder. The speed—at least in the crank angle range of compression—is a direct effect of filling (and friction). Therefore, the interpretation of the speed as a filling function proves to be a viable approach.

The invention is further based, inter alia, on the idea of creating a "more physical" working model with only a few variable parameters, which is capable of real-time operation and yet allows a sufficiently accurate determination of the fresh-air mass present in the cylinder. This is achieved precisely by using the speed, the micro-evolution of which in the compression range is much more influenced by the amount of oxygen in the cylinder than by other variables.

The invention is also based, inter alia, on the idea that, in addition to solving the control task for which the air mass is necessary in the operation of the internal combustion engine, time-filtered characteristic values can also be generated which show a long-term behavior of the engine and which are suitable for diagnostic purposes.

According to one embodiment, the load variables are modeled with the aid of thermodynamic relationships and graphical simplification (inter alia by removing weakly influencing edges in a graph model) for the real-time calculation. According to one embodiment, a diagnostic cylinder pressure is determined in the cylinder by determining a pressure signal in the cylinder from a high-resolution speed signal. According to one embodiment, the pressure signal is to be determined in a diagnosis time window which is within compression for the diagnosed cylinder after the end of the intake phase.

The diagnosis time window must be selected with the following conditions in mind in particular: (a) starts as early as possible after the inlet valves have closed; then the complete cylinder charge is trapped in the combustion chamber; (b) runs where no significant torque contributions are to be expected from the cylinder currently firing. The angular range of the diagnosis time window here is, for example, 30-45° KW.

According to one embodiment, a load value (=fresh-air mass parameter) is calculated in the calculated operating cycle for the calculated cylinder. The calculated load value is transferred to the next operating cycle. The feedforward control of the injector quantity can, if necessary, additionally have an input of a load value statically calculated beyond the scope of the invention (from the previous operating cycle) and, if necessary, an input of a load value offset transiently predicted beyond the scope of the invention.

For the context of the invention, real-time-capable means in particular that the measurement and calculation values for a particular operating cycle enable sufficiently accurate control of the fuel injection for the next operating cycle or the one after that.

According to one embodiment, the following variable quantities are determined in addition to the development in the speed in order to determine the simplified cylinder load parameter: (1) a cylinder volume at a diagnosis time point which lies, in particular centrally, within the diagnosis time window, and/or (2) a reduced piston acceleration in the diagnosis time window, and/or (3) a pressure in the intake manifold in the diagnosis time window.

Due to the use of only a few variable influencing quantities and the associated low-effort model calculation, this enables the fresh-air mass parameter to be determined quickly on the basis of the simplified cylinder load parameter. As a result of the reduced computational effort in the control means, the required computational speed can be achieved in order to determine the fresh-air mass parameter within one operating cycle with acceptable losses in accuracy and thus to enable direct control of the required fuel quantity in the next operating cycle, even in transient operation. According to one embodiment, only constants are used to determine the simplified cylinder load parameter and are stored in particular in a control means and/or were determined with the aid of the following procedure at the development engine: (I) Complete characteristic map (speed/load) is measured. (II) Evaluation of cylinder pressure indexing, calculation of residual gas fraction and temperature via gas exchange analysis. (III) Calculation of the respective characteristic values from the results and plotting over mean engine speed (characteristic curve).

The required speed of the simplified model calculation is achieved by careful filling of corresponding characteristic maps etc. in the development of the internal combustion engine and the provision of the constants resulting from the characterizing for the calculation of the simplified cylinder load parameter. The trade-off between speed of calculation, resource utilization and accuracy in the result can also be mediated by the filling of characteristic maps.

According to one embodiment, a pressure characteristic is determined for the identified cylinder in the diagnosis time window in dependence on the determined development in the speed and/or the determined reduced piston acceleration. According to one embodiment, the simplified cylinder load parameter is determined in dependence on the determined pressure characteristic and/or the determined cylinder volume.

By determining the pressure characteristic for direct dependence of which the simplified cylinder load parameter can be determined, it is possible to fall back on the high-resolution development in the speed available in the control unit, and thus the real-time control or feedforward control of the fuel injection quantity from operating cycle to operating cycle even in transient operation of the internal combustion engine.

According to one embodiment, it is determined before the other method steps whether steady-state operation (at least quasi steady-state operation), or transient operation of the internal combustion engine is present.

According to one embodiment, the method is only carried out if and/or as long as it is determined that a transient operation, in particular non-steady-state operation, of the internal combustion engine is present. According to one embodiment, the determined residual gas fraction is only stored and/or further used if and/or as long as it is determined that transient operation, i.e. in particular non-steady-state operation, of the internal combustion engine is present.

This means that the calculation resources of the control unit can be conserved, because a decision is made possible as to whether the method according to the invention is needed at all in the present operating state. This is because, for steady-state operation, sufficient means for determining the fresh-air mass in the cylinder are already available anyway in the engine control unit of modem, known internal combustion engines.

According to one embodiment, the fresh-air mass parameter in the identified cylinder is determined: only on the basis of the determined, simplified cylinder load parameter, or additionally on the basis of a steady-state cylinder load parameter determined for steady-state operation and/or an offset prediction of the fresh-air mass parameter, which is made in dependence on a, in particular the, steady-state cylinder load parameter. Also, according to one embodiment, a blending range can be provided in which the fresh-air mass parameter is determined, for example weighted and/or averaged from the values of the simplified cylinder load parameter, the steady-state cylinder load parameter and, if necessary, an offset prediction of the fresh-air mass parameter.

Depending on the operating state of the internal combustion engine—in particular depending on the degree of transience of engine operation—it may be sufficient to control the amount of fuel to be injected purely on the basis of the determined, simplified cylinder load parameter; or feedforward control of the injection amount is already performed on the basis of known methods for determining the amount of fresh air in the cylinder in steady-state operation or for offset prediction on the basis of such values.

According to one embodiment, the fresh-air mass parameter determined for a particular operating cycle of the identified cylinder serves as a basis for a determination of a fuel injection quantity for the subsequent operating cycle of the cylinder or a subsequently firing cylinder.

This makes it possible to ensure that in both transient and steady-state operation of the internal combustion engine, the required fuel injection quantity for combustion in the diagnosed cylinder can be provided in an operating-cycle-specific manner and with and high control quality—efficiently and in a resource-optimized manner with regard to the calculation in the engine control unit.

According to one embodiment, the development in the speed is determined with a real-time-capable sampling quality. This basis makes it possible to calculate the fresh-air mass present in the cylinder in transient operation in an operating-cycle-specific manner.

Further advantages and possible applications of the invention will become apparent from the following description in conjunction with the figures.

BRIEF DESCRIPTION OF THE DRAWINGS

FIGS. 1A, 1B, and 1C show schematic views of an internal combustion engine with an engine control system according to an exemplary embodiment of the invention, wherein FIG. 1A shows the installation environment of the internal combustion engine, FIG. 1B shows relevant parameters and FIG. 1C shows torque contributions at the crank mechanism of the internal combustion engine over time.

DETAILED DESCRIPTION

Figure 1A:
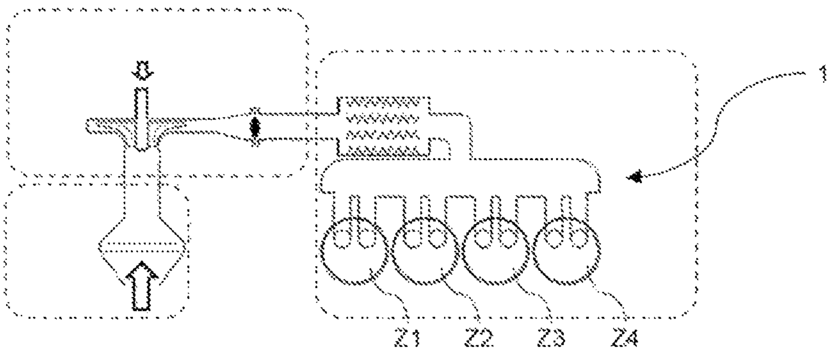
Figure 1B:
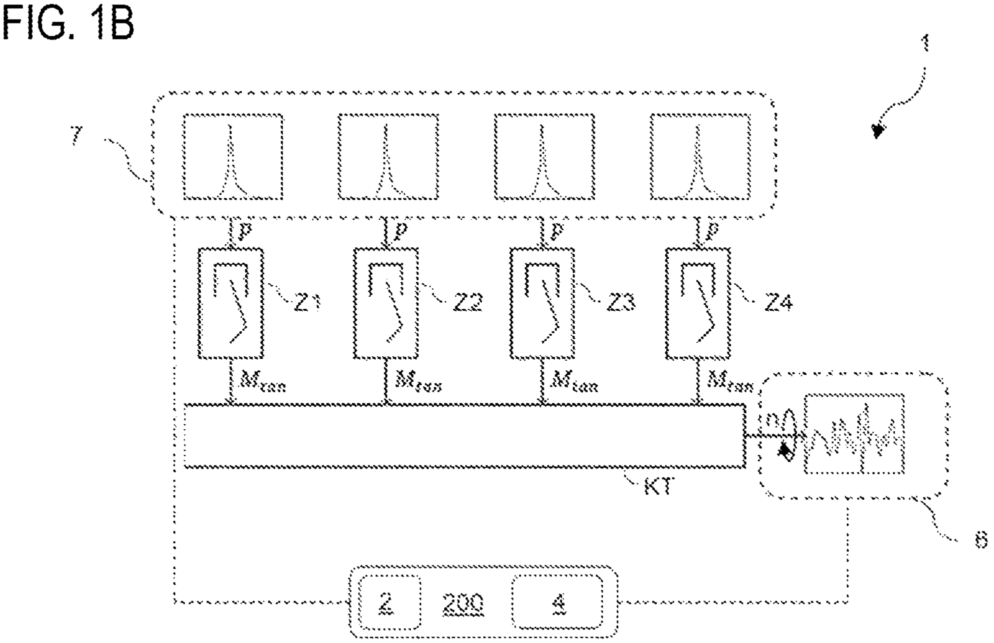

In FIG. 1B, the internal combustion engine 1 is shown in a more detailed schematic view. The internal combustion engine 1 has cylinders Z1, Z2, Z3 and Z4, wherein all cylinders Z provide their torque contribution M to a crankshaft of a crank drive KT. The internal combustion engine 1 additionally comprises a control means 2 according to an exemplary embodiment of the invention, optionally comprising a computing unit 4 if the control means 2 is not formed as part of an engine control unit. The control means 2 further comprises a speed detection unit 6 and a cylinder pressure detection unit 7 for the reference pressures from the surrounding environment and air collector or crankcase. The control means 2 also has a cylinder volume determination unit and a cylinder temperature determination unit and can access measured values of all lambda sensors of the internal combustion engine 1.

FIG. 1B shows, inter alia, that, depending on the particular cylinder pressure p, each cylinder Z can cyclically apply a torque contribution M to the crankshaft drive KT. The totality of the torque contributions results in a time-variable speed n of a crankshaft of the crank drive KT.

The reference pressure p can be used by means of the pressure detection unit 7, the instantaneous speed n can be used by means of the speed detection unit 6, and the computing unit 4 can be used by the device 2.

Figure 1C:
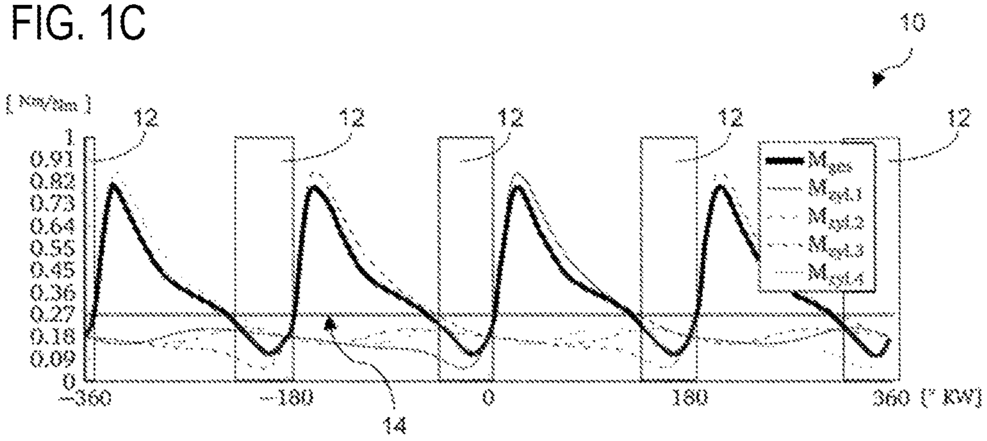

FIG. 1C shows a graph of a torque development $M_{ges}$ with an exemplary torque curve 10 at the crankshaft drive KT during normal operation over the crank angle KW. It is evident that the torque contribution M comes alternately from different cylinders Z. A torque limit value 14 is drawn in the illustration and is set in particular arbitrarily and determines below which torque a torque contribution of a cylinder is considered insignificant, so that a low-torque range 12 in the sense of the invention then exists. Consequently, a low-torque range 12 in the sense of the invention can be identified if, at a certain time interval, the torque contributions of each cylinder are below the limit value 14.

In the embodiment of FIG. 1C, low-torque ranges 12 of slightly different lengths result. Within each of these low-torque ranges 12, in particular, a diagnosis time window 112 can be defined and may comprise the entire period of the low-torque range or a part thereof.

Figure 2:
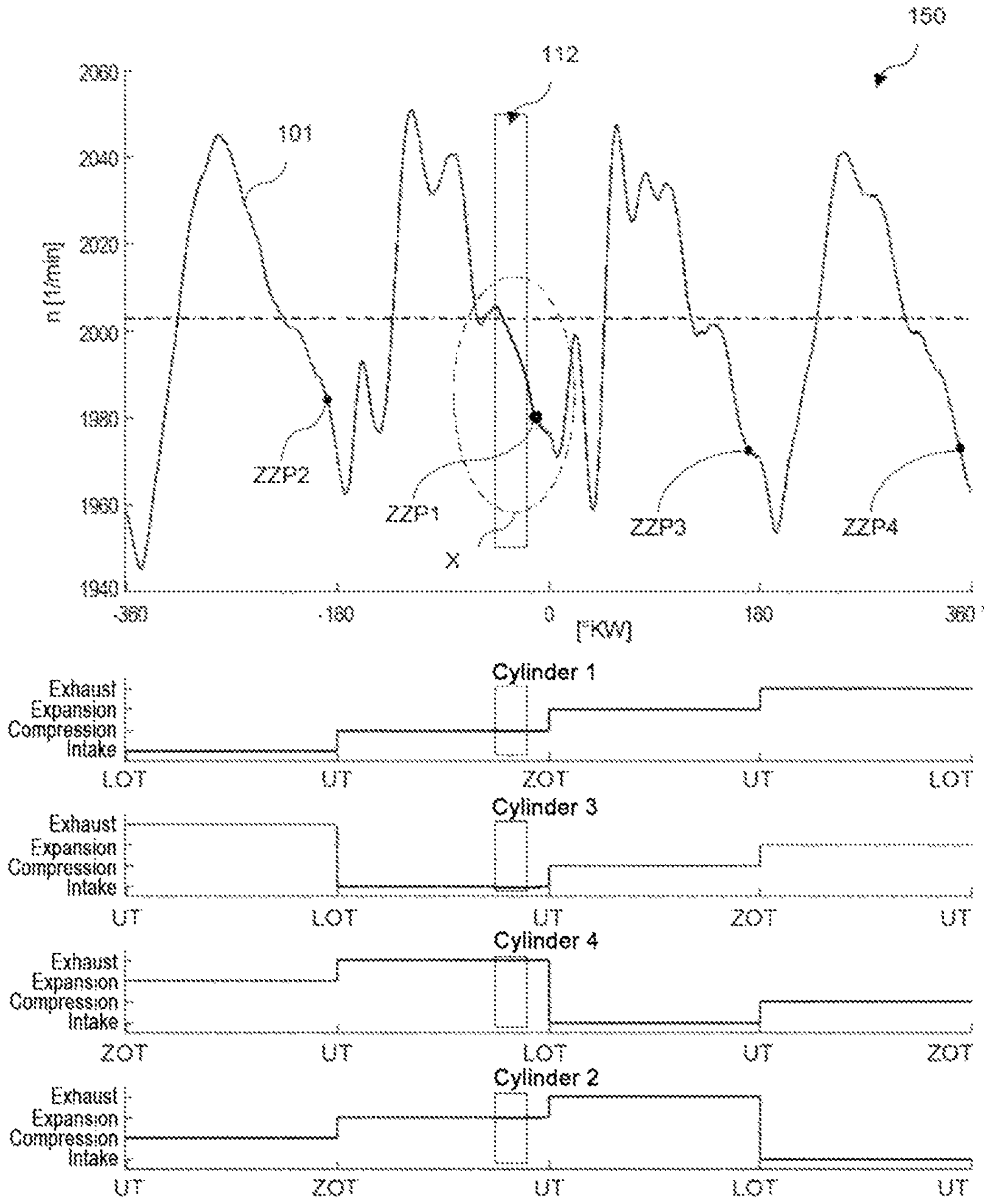
FIG. 2 shows a diagram with a graph of a development in the speed of an operating cycle of the internal combustion engine according to FIG. 1 and a representation of the cycles of the individual cylinders.

FIG. 2 shows a sketch of an exemplary graph 150 of a development in the speed 101 of a four-stroke cycle (=one operating cycle (ASP): top dead center charge change (LOT) →intake→bottom dead center (UT)→valve closure and compression→top dead center ignition (ZOT)→expansion→UT→exhaust) of the internal combustion engine 1.

The sequence diagram 150 shows the curve 101 of the engine speed n over an operating cycle (ASP) of a 4-cylinder gasoline engine. The ignition timing points (ZZP) and an example of a possible diagnosis time window 112 for the cylinder Z1 to be diagnosed in the compression phase are marked. Below this, the associated power strokes of the physical cylinders Z1-Z4 are shown.

This example of a four-cylinder engine shows which range 112 of the crank angle scale can be used for charge change diagnosis. The diagnosis time window 112 for the cylinder Z1 to be diagnosed is in the compression phase, i.e. when the intake phase has already been completed and there is also a low-torque range (cf. limit value 14 in FIG. 1C).

In particular, the diagnosis time window 112 must be selected so that the last cylinder performing work no longer achieves acceleration of the crankshaft and the next cylinder performing work has not yet fired.

In the exemplary embodiment, the diagnosis time window comprises a time interval in which the inlet valves of the cylinder Z1 to be diagnosed are closed again after the intake of the charge air or the combustion mixture, and in addition a low-torque range of the internal combustion engine 1 is present. The limits depend on an applied engine operating point and can be flexibly adapted thereto. Dynamic adaptation of the limits of the diagnosis time window 112 is also possible for dynamic driving operation in dependence on boundary conditions such as an ignition angle and the cylinder pressure curve.

In the exemplary embodiment, therefore, the diagnosis time window 112 is determined to be 660° KW to 690° KW, relative to a crank angle value of cylinder Z1. In the illustration of FIGS. 1C and 2—which is based on the entire internal combustion engine with four cylinders—this crank angle value corresponds to −60° to −30° before top dead center of ignition (ZOT). In the following, only 660° KW to 690° KW is concerned.

Figure 3:
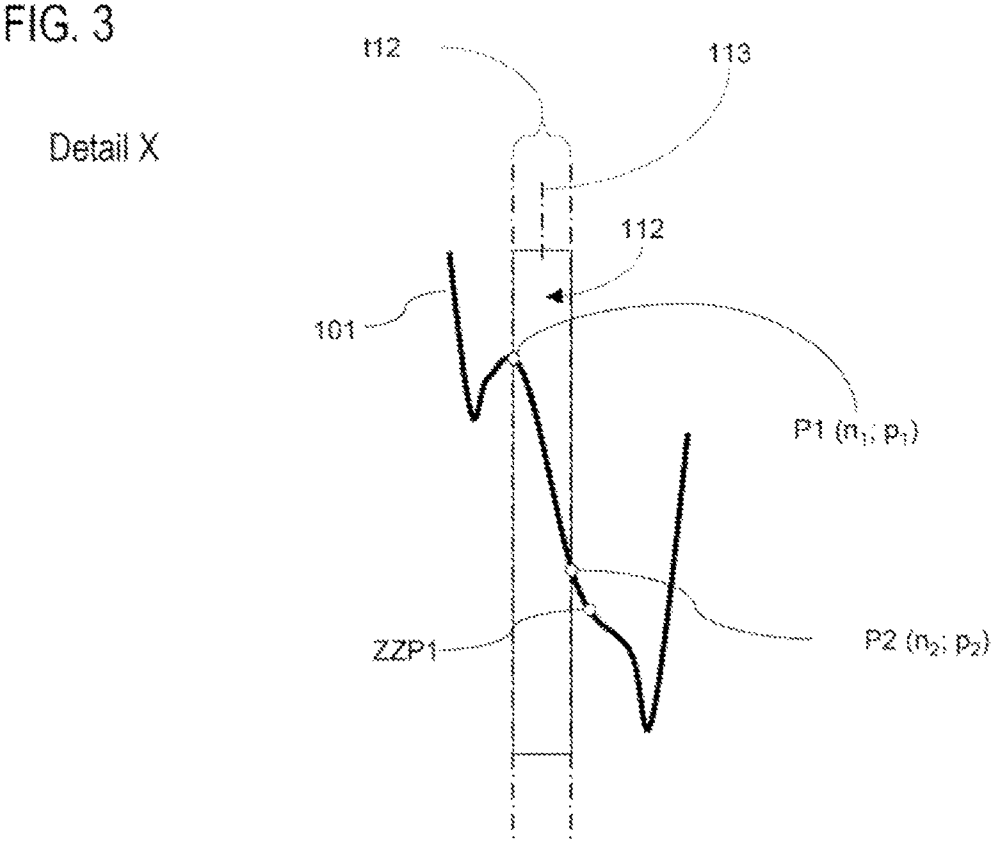
FIG. 3 shows an enlarged detail from the graph in FIG. 2.

FIG. 3 shows the detail X from FIG. 2, i.e. the development in the speed 101 over the crank angle KW during the diagnosis time window 112 with the limit points P1 and P2 of the diagnosis time window of cylinder Z1. The pressure $p_1$ prevails in the cylinder at point P1, and pressure p2 at point P2.

A diagnosis time point 113 in the diagnosis time window 112 is determined, for example in the middle of the diagnosis time window at 675° KW. For this time point, the temperature T* in the combustion chamber of cylinder Z1 is calculated, for example. For the determination of the diagnostic cylinder pressure $p_{diag}$ in dependence on the development in the speed 101, on the other hand, a time window such as the diagnosis time window 112 is required because the determination is based on a difference consideration.

FIGS. 2 to 6 explain an exemplary embodiment of methods according to the invention for determining a fresh-air mass parameter rf in a cylinder Z of the internal combustion engine 1 in driving operation with the aid of the crankshaft speed n of the crankshaft drive KT.

Figure 6:
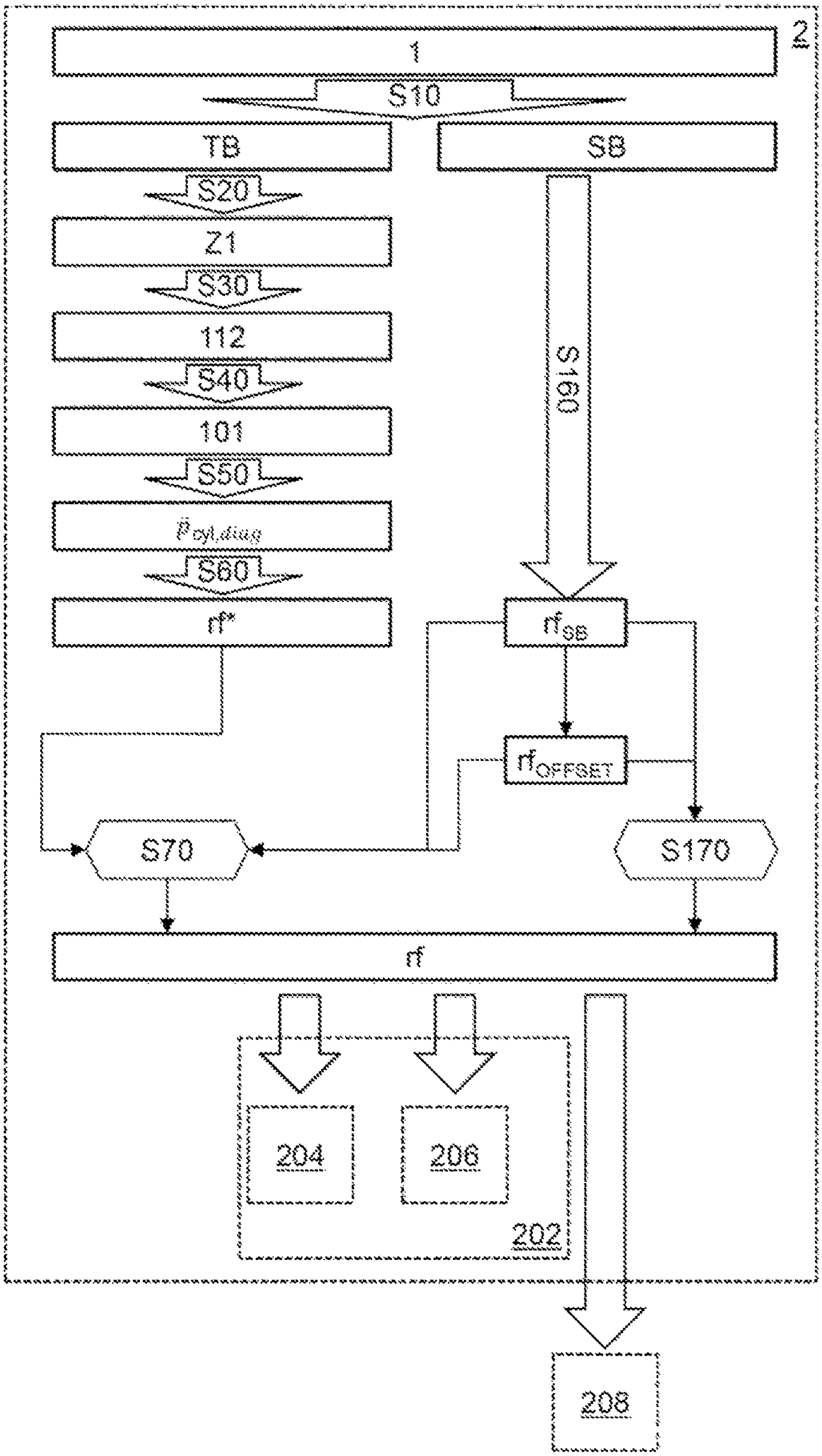
FIG. 6 shows a method carried out in an exemplary embodiment.

As shown in FIG. 6, the method carried out in the exemplary embodiment is described below: S10: Determine whether at least quasi steady-state operation SB or transient operation TB of the internal combustion engine 1 is present.

S20: If transient operation TB of the internal combustion engine is present, the cylinder Z1 which is at the end of the intake stroke or at the beginning of the compression stroke is identified.

S30: Determine the diagnosis time window 112 for the identified cylinder Z1 in the low-torque range 12 of the internal combustion engine 1.

S40: Determine the development of the speed 101 of the internal combustion engine during the specified diagnosis time window 112 with a real-time-capable sampling quality. A live engine control function continuously reads out speed values n for the crankshaft KT during driving operation (due to gas friction delay (and for the present purposes disregarded delay due to mechanical friction), an increased speed drop from one to a subsequent point in time is to be expected in a compression phase of a cylinder) and determines a development in the speed from this—cf. FIGS. 1-3.

S50: Determine the pressure characteristic $\overline{p}_{cyl,diag}$ for the cylinder Z1 in diagnosis time window 112 in dependence on the determined development in the speed 101.

S60: Determine the simplified cylinder load parameter rf* in dependence on the determined pressure characteristic $\overline{p}_{cyl,diag}$ for the cylinder Z1 in the diagnosis time window 112.

S70: Determine the fresh-air mass parameter rf for transient operation TB in the identified cylinder Z1 in dependence on the determined simplified cylinder load parameter rf*, in the exemplary embodiment additionally in dependence on a steady-state cylinder load parameter $rf_{SB}$ and/or an offset prediction $rf_{OFFSET}$ of the fresh-air mass parameter derived therefrom and determined in a manner known per se by means of the engine control unit for steady-state operation (cf. step S160 for steady-state operation SB). Depending on the operating state of the internal combustion engine—in particular depending on the degree of transience of engine operation—control of the fuel quantity to be injected purely on the basis of the determined, simplified cylinder load variable may be sufficient; or the injection quantity may already be subject to feedforward control on the basis of known methods for determining the fresh air quantity in the cylinder in steady-state operation or for offset prediction on the basis of such values.

S160: A steady-state cylinder load parameter $rf_{SB}$ and/or an offset prediction $rf_{OFFSET}$ of the fresh-air mass parameter derived therefrom are determined in a manner known per se by means of the engine control unit. The step can also be carried out to support the feedforward control of the fuel injection quantity if transient operation TB is present; cf. input variables for determining the fresh-air mass parameter rf according to step S70.

S170: Determine the fresh-air mass parameter rf for steady-state operation SB in the identified cylinder Z1 in dependence on a steady-state cylinder load parameter $rf_{SB}$ already determined (in a manner known per se) by means of the engine control unit for steady-state operation and/or an offset prediction $rf_{OFFSET}$ of the fresh-air mass parameter derived therefrom. The simplified cylinder load parameter rf* is not used for steady-state operation SB.

In the exemplary embodiment, various options are provided for using the determined values of the fresh-air mass parameter rf for onboard diagnostics 204 and/or offboard diagnostics 208 and/or control tasks 206 by means of the engine control unit 2 (cf. FIG. 6).

For this purpose, the values determined are continuously stored in a non-volatile memory 202 of the engine control unit 2 during driving operation of the motor vehicle or are stored for further use. If, for example, the associated value for the fresh-air mass parameter rf is evaluated for each cylinder Z at each ignition, a new value of the fresh-air mass parameter rf is stored in the memory 202 for each ignition—in particular with a time stamp and/or output values for determining and/or specifying the diagnosed cylinder, for example Z1.

The stored values of the fresh-air mass parameter rf can be provided in real time, i.e. in particular immediately during driving operation, for example to an online diagnostic component 204 and/or an engine closed-loop control 206 of the engine control unit 2. Also, the values of the fresh-air mass parameter rf can be made available to an offboard diagnostic computer 208 at a later time, for example in the workshop.

In the following, it is explained in detail—inter alia on the basis of the illustrations in FIGS. 4 and 5—how the simplified cylinder load parameter rf* and, on that basis, the fresh-air mass parameter rf are determined in the exemplary embodiment.

Figure 4:
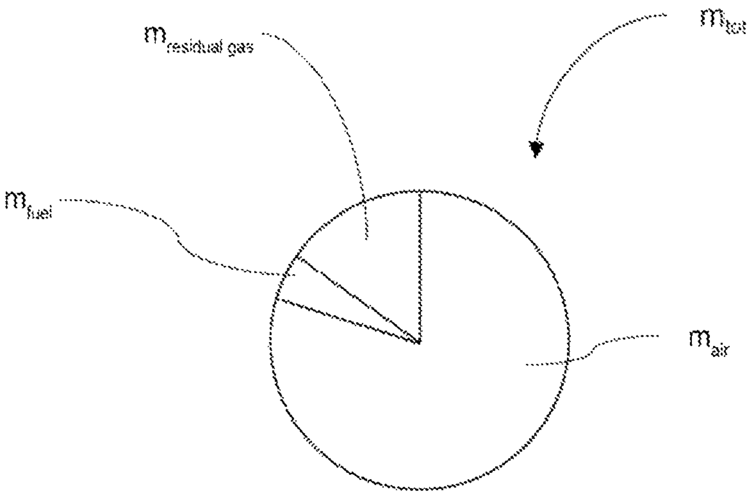
FIG. 4 shows a diagram of a mass balancing in the selected cylinder.

As can be seen from FIG. 4, the following relationship applies to the composition of the gas mass in cylinder Z1 in diagnosis time window 112:

$$m = m_{tot} = m_{air} + m_{fuel} + m_{residual\ gas} \tag{1}$$

The following relationship exists here between the air mass and the fuel mass:

$$m_{fuel} = \frac{m_{air}}{\lambda \cdot L_{st}} \tag{2}$$

| Formula symbol | Meaning |
|---|---|
| $\lambda$ | measured combustion air ratio (<1 = "rich", 1 = stoichiometric, >1 = "lean") |
| $L_{st}$ | fuel-dependent chemical constant, so-called stoichiometric fuel-air ratio, typically between 14-16 |

Equation (2) in (1) gives $$m_{tot} = m_{air} \cdot \left(1 + \frac{1}{\lambda \cdot L_{st}}\right) + m_{residual\ gas} \tag{3}$$

In the exemplary embodiment, a substitution of the residual gas mass takes place via typical engine control variables:

$$m_{residual\ gas} = xrg \cdot m_{tot} \tag{4}$$

The residual gas mass can be interpreted as fraction xrg of the total mass.

In order to perform a substitution of the absolute air mass in equation 3, the following relationship is introduced based on typical engine control variables:

$$m_{air} = rf_{SB} \cdot \frac{p_0 \cdot V_{max}}{R \cdot T_0} \tag{5}$$

| Formula symbol | Meaning |
|---|---|
| $rf_{SB}$ | Steady-state fresh-air mass parameter, relative air charge of the cylinder in % |
| $p_0$ | atmospheric pressure under standard conditions (1013 hPa) |
| $V_{max}$ | maximum cylinder volume at bottom dead center of the crankshaft |
| R | ideal gas constant |
| $T_0$ | ambient temperature under standard conditions (293 K) |

The current air mass in the cylinder is determined in advance in the engine control unit as the steady-state fresh-air mass parameter $rf_{SB}$ for the purpose of correct fuel addition.

The function known per se and already present in the engine control unit for this purpose is the so-called load detection for steady-state engine operating states. It estimates a relative filling in percent.

The aim of the exemplary method described here is to improve the estimation of the reference variable rf. (The filling rf is defined as 100% if the max. cylinder volume were completely filled with air under standard conditions, cf. ideal gas equation):

$$m_{air} = rf \cdot \frac{p_0 \cdot V_{max}}{R \cdot T_0} \tag{5.5}$$

The total cylinder mass in turn results from the current thermodynamic ratios of cylinder pressure p*, cylinder volume V* and temperature T* in the cylinder, since the cylinder is not only filled with air and the components of fuel and residual gas lead to an increase in pressure:

| Formula symbol | Meaning |
| --- | --- |
| p* | Cylinder pressure in diagnosis time window |
| V* | Cylinder volume at time of diagnosis |
| R | ideal gas constant |
| T* | Temperature T* in the cylinder at the time of diagnosis |

$$m_{tot} = \frac{p^* \cdot V^*}{R \cdot T^*} \tag{6}$$

Insertion of (6), (5.5) and (4) into (3) including rearrangement and truncation leads to this relationship:

$$p^* \cdot V^* \cdot \frac{1-xrg}{T^*} = rf \cdot \frac{p_0 \cdot V_{max}}{T_0} \cdot \left(1 + \frac{1}{\lambda \cdot L_{st}}\right) \tag{7}$$

Based on FIGS. 5A-E, it is explained below how—starting from equation (7)—a simplified relationship is established which manages with a smaller number of variable quantities and thus also with significantly lower computing power in the engine control unit, so that a simplified cylinder load parameter rf* can be determined in real time. In this exemplary embodiment, real-time capability means that the simplified cylinder load parameter rf* can be used to determine a fuel injection quantity for the next cycle on the basis of the values determined for one cycle.

FIGS. 5A-F show a graphical derivation of simplifying assumptions for the interrelationships of the cylinder content parameters and the state variables.

Figure 5A:
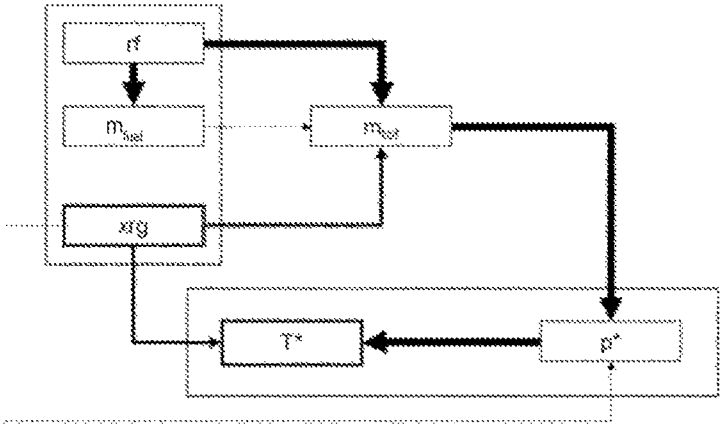
FIGS. 5A, 5B, 5C, 5D, 5E and 5F illustrate the process of reducing the complex relationships of a residual gas mass and a temperature in the cylinder to a simple set of formulas that enables real-time calculation on an engine control unit.
Figure 5B:
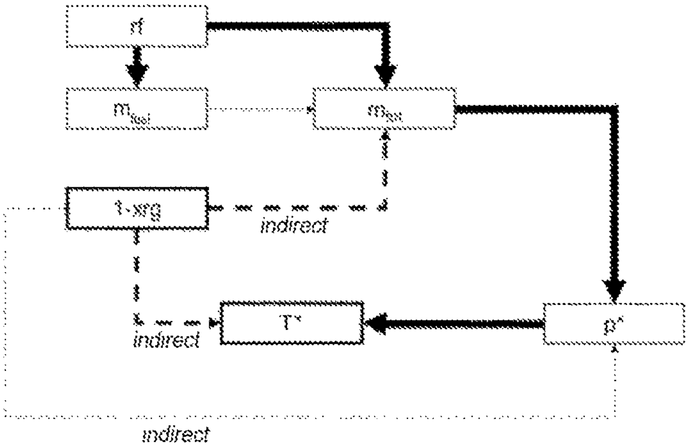
Figure 5C:
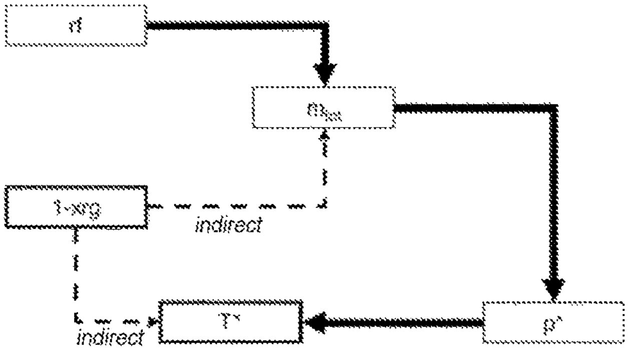
Figure 5D:
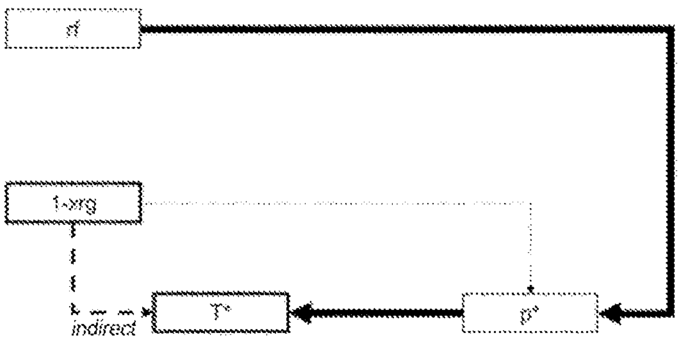
Figure 5E:
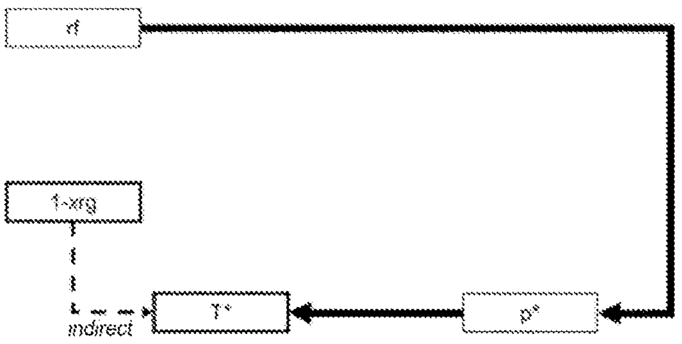
Figure 5F:
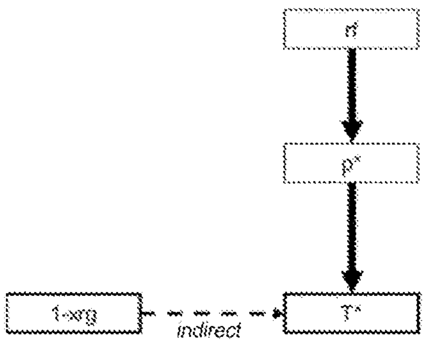

Starting from the complete relationship shown in FIG. 5A, a further simplification is introduced with each further FIGS. 5B, 5C, 5D and 5E, so that finally in FIG. 5F a simplified relationship is shown which nevertheless still permits a statement accuracy sufficient for the purposes of the invention.

The simplifications for equation (7) are aimed at parameterizing the residual gas fraction xrg and the cylinder temperature T*.

FIG. 5A shows the full relationship of the variables. The line thickness represents the correlation strength. Each line is considered in first approximation as an approximation of a proportionality relation, in order to simplify again the existing equation set later. Dashed lines indicate inverse proportionality (and are marked "indirect" accordingly).

The cylinder Z1 is filled with a fresh-air mass $m_{air}$, which is represented by the fresh-air mass parameter rf. In addition, the cylinder is filled with the fuel mass mruei and a residual gas mass $m_{residual\ gas}$, which is represented by the residual gas fraction xrg.

Indirectly or directly, all three parameters of the cylinder content act on at least one of the two relevant state variables of the mixture in the cylinder Z1, namely p* and V*.

The residual gas fraction xrg has a medium influence on the total mass $m_{tot}$ in the cylinder; likewise on the temperature T*. The residual gas fraction xrg also has a small influence on the pressure p* in the cylinder. Both are known from experimental observations and can be regarded as generalizable.

The fresh-air mass parameter rf has a major influence in each case on the total mass $m_{tot}$ in the cylinder and thus also on the fuel mass $m_{fuel}$.

The total mass $m_{total}$ in the cylinder in turn has a large influence on the cylinder pressure p* via the ideal gas equation.

The cylinder pressure p* in turn has a large influence on the temperature T* star in the cylinder.

FIG. 5B shows a change in the use of the residual gas fraction xrg to an inversely proportional consideration to allow for a later simplification step in which an indirect influence of the residual gas fraction on the cylinder pressure is introduced (cf. Figure D).

In FIG. 5C, a removal of "weak" connections and then solitary adjacent elements occurs.

In FIG. 5D, the intermediate quantity $m_{tot}$ is substituted as shown.

In FIG. 5E, a "weak" connection resulting from the substitution step is removed.

In FIG. 5F, only a conversion to the temperature T* as the target variable is shown. Since each line was considered as an approximation of a proportionality relation, two borrowable substitution equations result from the diagram shown. The first substitution equation is:

$$T^* = C2 \cdot p^* \tag{8}$$

With the further relationship $$(T^*)^{C1} \cdot (1-xrg)^1 = C0 | C1 > 1$$

this gives $$(C2 \cdot p^*)^{C1} \cdot (1-xrg) = C0$$

and by combining the constants $$p^{*C1} \cdot (1-xrg) = C3$$

or converted to the second substitution equation $$1-xrg = C3 \cdot p^{*-C1} \tag{9}$$

Equations (8) and (9) are now used for the corresponding variables of equation (7) and, in addition, an amalgamation of the constants is provided:

$$C4 \cdot p^{*C5} \cdot V^* = rf \cdot \frac{p_0 \cdot V_{max}}{T_0} \cdot \left(1 + \frac{1}{\lambda \cdot L_{st}}\right) \tag{10}$$

The determination of the constants C4, C5, etc. in the model equations was carried out in the exemplary embodiment on the development engine with the aid of the following procedure: a complete characteristic map (speed/load) is measured; evaluation of cylinder indexing p* and calculation of xrg and T* via corresponding gas exchange analyses; then, accordingly, a calculation of the respective characteristic values is carried out from the results and plotting over mean engine speed (characteristic curve).

The combining of the constant C4 with the fixed values $p_0$, $T_0$ and $V_{max}$ gives in the following:

$$C6 \cdot p^{*C5} \cdot V^* = rf \cdot \left(1 + \frac{1}{\lambda \cdot L_{st}}\right) \tag{11}$$

Lastly, it is now possible to convert to rf and thus derive the determination rule for the relative load, in this case initially the simplified fresh-air mass parameter rf*:

$$rf^* = C6 \cdot \frac{p^{*C5} + C7}{1 + \frac{1}{\lambda \cdot L_{st}}} \cdot V^* \tag{12}$$

The constant C7 was introduced subsequently in the application of equation (12) to make the model as adaptable as possible. (The constant C7 can also be assumed to be C7=0 in the initial application and can later take on other values accordingly for improved model accuracy).

Below is a table for determining the open parameters for rf estimation:

| Value | Unit | Description |
|---|---|---|
| C6 | [%/Nm] | Scaling factor: working term to load |
| C5 | [—] | Exponential scaler: pressure to load |
| C7 | [bar] | Offset: pressure to load (Default = 0) |

The values for λ, $L_{St}$ and V*, in each case for a time defined by the crankshaft position of the diagnosis time point 113, can be taken from known engine control units, including that of the exemplary embodiment.

A diagnostic cylinder pressure value $\overline{p}_{cyl,diag}$ for the diagnosis time window 112 is determined as the value for p*.

How this is possible can be taken from the following description for equations (13)-(28), wherein, from the determined diagnosis time window (see explanations for FIG. 2) $\varphi_1$ corresponds to the crank angle KW=660°[0] of P1 and p2 corresponds to the crank angle KW=690° of P2, and accordingly in the shown exemplary embodiment $\overline{p}_{cyl,diag}=p_{cyl1,diag,660\text{-}690}$.

The determination is based on a pressure balancing of the diagnosed cylinder on the basis of the measured speed curve:

$$\frac{d}{dt}\left(\frac{1}{2}\cdot J_0\cdot\omega^2\right)=(M_{tan}-M_R-M_L)\cdot\omega$$

| Formula symbol | Meaning |
|---|---|
| $J_0$, J | General/proportional mass moment of inertia |
| φ | Angular position of crankshaft |
| ω | Angular velocity |
| $M_{tan}$ | Moment due to gas force in cylinder and oscillating mass force |
| $M_R$ | Moment due to friction losses |
| $M_L$ | Moment due to load reduction |
| $M_M$ | Proportional moment due to rotational mass inertia |
| $n_{mot}$ | Currently applied motor speed |

By differentiation, substitution and introduction of a mass moment (division of inertia components), the following equation is obtained:

$$J\cdot\dot{\omega}=\sum_i M_i=M_{tan}-M_R-M_L-M_M$$

If the equation is divided sensibly into a "constant component" and an "alternating component", the following sub-equations are obtained:

"Constant component": $\overline{M_{tan}}=\overline{M_R}-\overline{M_L}$

The balancing of the constant component assumes a steady-state operating point. The mean provided torque keeps the mean speed constant because it corresponds to the torque demands from load and friction.

"Alternating component": $J\cdot\dot{\omega}=\tilde{M}_{tan}-\tilde{M}_R-\tilde{M}_M$ (13)

A conversion from time-based derivation to crank-angle-based differencing is performed using the relationship $$\omega=\frac{d\varphi}{dt}=\pi\cdot\frac{n_{mot}}{30}\text{per} \quad (14)$$

$$\dot{\omega}\approx\left(\frac{\pi}{30}\right)^2\cdot nmot\cdot\frac{\Delta nmot}{\Delta\varphi}$$

The decisive quantities from equation (13) are further detailed for the evaluation. The relationship for the resulting moment from the inner-cylindrical gas force results in:

$$\widetilde{\overline{M}}_{tan}=[A_K\cdot[P_{cyl}(\varphi)-p_0]-m_{osc}\cdot\ddot{s}(\varphi)]\cdot r_K\cdot\frac{\sin(\varphi+\beta)}{\cos\beta} \quad (15)$$

| Formula symbol | Meaning |
|---|---|
| $A_K$ | Piston top surface = const. |
| $r_K$ | Effective radius of the crankshaft corresponds to half stroke = const. |
| $l_{Pl}$ | Connecting rod length = const. |
| $m_{osc}$ | Oscillatory mass part corresponds to piston assembly and proportional connecting rod mass = const. |
| $p_{cyl}$ | Pressure prevailing in cylinder |
| $p_0$ | Reference pressure, crankcase pressure |
| B(φ) | Connecting rod pivot angle in dependence on crank angle position |
| $\ddot{s}$(φ) | Piston acceleration in dependence on piston position |

A further detailing of the variable factors from equation (15) gives:

$$\ddot{s}(\varphi,\dot{\varphi},\ddot{\varphi})=r_K\cdot\sin\varphi+r_K\cdot\dot{\varphi}^2\cdot\cos\varphi r_K/_2\lambda_{Pl}\cdot\sin(2\cdot\varphi)+r_K\cdot\dot{\varphi}^2\cdot\lambda_{Pl}\cdot\cos(2\cdot\varphi)$$

Assuming a constant mean speed nmot, the relationship for the piston acceleration becomes simpler:

$$\ddot{S}_{red}(\varphi,\dot{\varphi})=r_K\cdot\dot{\varphi}^2\cdot(\cos\varphi+\lambda_{pl}\cdot\cos(2\varphi)) \quad (16)$$

The assumption leads to an error that can be disregarded. The influence of the angular acceleration results in a negligible deviation over the entire characteristic map.

$$\beta(\varphi)=\arcsin(\lambda_{pl}\cdot\sin\varphi) \quad (16.5)$$

Push rod ratio $$\lambda_{Pl=rK}/l_{Pl} \quad (17)$$

$$P_{cyl}=\overline{P}_{cyl} \quad (18)$$

Reference to ambient pressure $$P_0=P_{amb} \quad (19)$$

or as also used in the following the reference to crankcase pressure $$P_0=P_{Crkc}=P_{amb}-DPS \quad (20)$$

wherein DPS stands for the negative pressure (pressure difference) in the intake manifold.

The frictional torque from equation (13) can be represented in different ways. Either a model can be introduced which reflects measured data for a specific operating point of the diagnosis. A target-oriented approach here would be a functional linking of the term with the speed, the load and the oil temperature.

In the following, however, it is assumed that the diagnosis is carried out at fixed, steady-state load points. This means that the frictional torque for this load point can be assumed to be invariable.

$$\tilde{M}_R = \text{const.} \tag{21}$$

The same approach is also used for the proportional moment due to rotational inertia and the mass moment of inertia.

$$\widetilde{M}_{M\,M} = \text{const.} \tag{22}$$

$$J = \text{const.} \tag{23}$$

A suitable choice of diagnostic constants at the steady-state operating point allows easy application of the parameters in retrospect.

Solving equation (13) according to the gas moment gives:

$$\widetilde{M_{tan}} = J \cdot \dot{\omega} + \widetilde{M_R} + \widetilde{M_M}$$

After inserting the relationships from equations (21) to (23), the following simplification with the application constant K_RM can be concluded:

$$\widetilde{M_{tan}} = J \cdot \omega + K_{RM} \tag{24}$$

Application of the Diagnosis:

FIG. 3 shows the detail X from FIG. 2, i.e. the development in the speed 101 over the crank angle KW during the diagnosis time window 112 with the measuring points P1 and P2 in the compression of cylinder Z1. Pressure $p_1$ prevails in the cylinder at point P1, and pressure p2 at point P2.

The gradient of the angular velocity from equation (14) is expanded. The speed to be determined must be averaged here, and constants are marked again.

$$\dot{\omega} \approx \left(\frac{\pi}{30}\right)^2 \cdot \overline{n_{mot}} \cdot \frac{\Delta n_{mot}}{\Delta \varphi} \tag{25}$$

$$\dot{\omega} \approx \left(\frac{\pi}{30}\right)^2 \cdot \frac{n_{mot_2} + n_{mot_1}}{2} \cdot \frac{n_{mot_2} - n_{mot_1}}{\varphi_2 - \varphi_1}$$

$$\dot{\omega} \approx \frac{1}{2} \cdot \left(\frac{\pi}{30}\right)^2 \cdot \frac{n_{mot_2^2} - n_{mot_1^2}}{\varphi_2 - \varphi_1}$$

$$\dot{\omega} \approx K_\omega \cdot \frac{n_{mot^2} - n_{mot_1^2}}{\varphi_2 - \varphi_1}$$

The term for the tangential moment from equation (15) is expanded in the following by the relationships from equations (16) to (20), and constants are marked.

$$\tilde{M}_{tan} = \left[\frac{(p_1 + p_2 - 2 \cdot p_{amb} + 2 \cdot DPS)}{2} \cdot A_K - m_{osc} \cdot \ddot{s}(\varphi)\right] \cdot r_K \cdot \frac{\sin(\varphi + \beta)}{\cos\beta} \tag{25.5}$$

$$\tilde{M}_{tan} = \left[\frac{(p_1 + p_2 - 2 \cdot p_{amb} + 2 \cdot DPS)}{2} \cdot A_K - m_{osc} \cdot \ddot{s}(\varphi)\right] \cdot K_K$$

with a kinematic constant for the steady-state point in which the diagnosis takes place $$K_K = r_K \cdot \frac{\sin(\varphi + \beta)}{\cos\beta} \tag{26}$$

After inserting equations (26) and (25) into equation (24), resolving according to the cylinder pressures, and amalgamating all constants, the following is given:

$$\left[\frac{(p_1 + p_2 - 2 \cdot p_{amb} + 2 \cdot DPS)}{2} \cdot A_K - m_{osc} \cdot \ddot{s}(\varphi)\right] \cdot K_K = J \cdot K_\omega \cdot \frac{n_{mot_2^2} - n_{mot_1^2}}{\varphi_2 - \varphi_1} + \kappa_{RM} \tag{27}$$

$$\frac{p_1 + p_2}{2} = \frac{J \cdot K_\omega}{K_K \cdot A_K} \cdot \frac{n_{mot_2^2} - n_{mot_1^2}}{\varphi_2 - \varphi_1} + \frac{K_{RM}}{K_K \cdot A_K} + \frac{m_{osc} \cdot \ddot{s}(\varphi)}{A_K} + p_{amb} - DPS$$

$$\frac{p_1 + p_2}{2} = K_1 \cdot \frac{n_{mot_2^2} - n_{mot_1^2}}{\varphi_2 - \varphi_1} + K_2 + \frac{m_{osc} \cdot \ddot{s}(\varphi)}{A_K} + p_{amb} - DPS$$

All pressure variables and speeds in equation (27) can be measured at the times P1 and P2 for the conditions of the constants shown. A suitable indexing measurement technique, known per se, resolves the necessary physical quantities based on the crank angle or at least averaged over several operating cycles. In addition or as an alternative to the indexing measurement technique, data from a suitable operating model, for example the motor control system, can be used. The kinematic constant $K_K$ can be tabulated and used in dependence on the piston position.

The influence of the speed $n_{mot}$ related to the oscillatory masses can, for example, be calculated in real time or stored on the control unit in the form of a lookup table of a suitably stored operating model with respect to speed and load.

The reduced piston acceleration (cf. in particular equation (16)) can be formulated for the two discrete points:

$$\ddot{s}_{red}(\varphi, \dot{\varphi}) = r_K \cdot \left[\frac{\frac{\pi}{30} n_{mot_1} + n_{mot_2})}{2}\right]^2 \cdot \left[\cos\left(\frac{\varphi_1 + \varphi_2}{2}\right) + \cos(\varphi_1 + \varphi_2)\right] \tag{27.5}$$

The constants $K_1$ and $K_2$ can be determined on the basis of reference measurements (motor function and load change OK, respectively).

After determining the application constants $K_1$ and $K_2$, equation (27) can be used to determine the diagnostic cylinder pressure from the speed change in the compression:

$$\overline{p}_{cyl,diag} = K_1 \cdot \frac{n_{mot_2^2} - n_{mot_1^2}}{\varphi_2 - \varphi_1} + K_2 + \frac{m_{osc} \cdot \ddot{s}_{red}(\varphi, n_{mot})}{A_K} + p_{amb} - DPS \tag{28}$$

The diagnostic cylinder pressure $\overline{p}_{cyl,diag}$ is an indicator of the pressure curve during the compression stroke of the cylinder.

In this way, the diagnostic cylinder pressure $\overline{p}_{cyl,diag} = p_{cyl,diag}$, 660-690 can be determined for the diagnosis time window 112 of the diagnosed cylinder Z at the time interval t12=t[P1; P2] in driving operation.

This calculation of the diagnostic cylinder pressure $p_{cyl,diag}$, 660-690 in the calculated operating cycle for the calculated cylinder is used to estimate the simplified cylinder load parameter rf* in the next operating cycle according to equation (12).

The fresh-air mass parameter rf can then also be determined from this, if necessary, in dependence on the steady-state cylinder load parameter $rf_{SB}$ determined for steady-state operation and/or an offset prediction $rf_{OFFSET}$ derived from this. Weightings with which the simplified fresh-air mass parameter rf*, the steady-state fresh-air mass parameter $rf_{SB}$ and/or the offset prediction $rf_{OFFSET}$ are included in the calculation of rf for transient operating states TB are in themselves dependent on the degree of transience and/or other expert considerations considered on their own.

Feedforward control of the fuel injection quantity into the cylinder Z1 then takes place in the exemplary embodiment for an operating cycle on the basis of the value of the fresh-air mass parameter rf determined for the previous operating cycle.

LIST OF REFERENCE SIGNS

1 Internal combustion engine
2 Control means
4 Computing unit
6 Detection unit for the speed of the crankshaft
7 Cylinder pressure detection unit
9 Intake system
10 Torque curve of the internal combustion engine over an engine cycle
12 Low-torque ranges
14 Predetermined limit for relevant torque contribution
16 Cylinder temperature detection unit
18 Lambda sensor
150 Graph showing development in the speed
101 Speed curve
112 Diagnosis time window
113 Diagnosis time point
200 Engine control unit
202 Memory
204 Diagnostic component of an engine control unit
206 Control component of an engine control unit
208 Offboard diagnostic computer
KT Crank drive
KW Crank angle
$L_{St}$ Stoichiometric fuel-air ratio, fuel-specific
$m_{fuel}$ Fuel mass in the cylinder
$m_{air}$ Air mass in the cylinder
$m_{residual\ gas}$ Residual gas mass in the cylinder
$m_{tot}$ Gas mass in the cylinder
M Torque of a cylinder in FIG. 1
n Speed
p* Cylinder pressure at time of diagnosis
$P_{cyl,diag}$ Pressure index, here diagnostic cylinder pressure
P Measurement time points at the beginning and end of the diagnosis time window
$p_0$ Atmospheric pressure under standard conditions (1013 hPa)
R ideal gas constant
rf Fresh-air mass parameter; relative air charge of the cylinder in %.
rf* Simplified cylinder load parameter
$rf_{SB}$ Steady-state cylinder load parameter
$rf_{Offset}$ Offset prediction
SB Steady-state operation
τ Time interval in the diagnosis time window
T* Temperature of the gas mixture in the cylinder at time of diagnosis
$T_0$ Ambient temperature under standard conditions (293K)
TB Transient operation
V* Cylinder volume at time of diagnosis
$V_{max}$ maximum cylinder volume at bottom dead center of crankshaft
xrg Residual gas fraction
Z Cylinder
ZZP Ignition timing point of a cylinder
λ Combustion air ratio

The invention claimed is:

1. A method for determining a fresh-air mass parameter in a cylinder of an internal combustion engine in a motor vehicle, the method comprising:
identifying a cylinder which is at an end of an intake stroke or at a beginning of a compression stroke during driving operation of the motor vehicle;
determining a diagnosis time window which lasts for a period of time after closing inlet valves of the identified cylinder within a low-torque range of the internal combustion engine;
determining at least two values of a crankshaft speed of the internal combustion engine during the diagnosis time window;
determining a cylinder load parameter in the identified cylinder in dependence on the determined at least two values of the crankshaft speed;
determining the fresh-air mass parameter in the identified cylinder in dependence on the determined cylinder load parameter; and
controlling a fuel injection quantity for a subsequent operating cycle of the cylinder or a subsequently firing cylinder based on the fresh-air mass parameter in the identified cylinder.

2. The method according to claim 1, comprising: wherein the following variable quantities are determined in addition to the at least two values of the crankshaft speed in order to determine the cylinder load parameter:
determining a cylinder volume at a diagnosis time point which lies within the diagnosis time window in order to determine the cylinder load parameter in addition to the at least two values of the crankshaft speed; and/or
determining a reduced piston acceleration in the diagnosis time window in order to determine the cylinder load parameter in addition to the at least two values of the crankshaft speed.

3. The method according to claim 2, comprising:
using only constants and the determined at least two values of the crankshaft speed to determine the cylinder load parameter.

4. The method according to claim 2, comprising:
determining a pressure characteristic for the identified cylinder in the diagnosis time window in dependence on the determined at least two values of the crankshaft speed and/or the determined reduced piston acceleration; and
determining the cylinder load parameter in dependence on the determined pressure characteristic and/or the determined cylinder volume.

5. The method according to claim 1, comprising:
determining, before the identifying the cylinder, whether at least quasi steady-state operation or transient operation of the internal combustion engine is present.

6. The method according to claim 5, comprising:
carrying out the method if and/or as long as it is determined that that a transient operation of the internal combustion engine is present.

7. The method according to claim 5, comprising:
storing and/or using a determined residual gas fraction if and/or as long as it is determined that transient operation of the internal combustion engine is present.

8. The method according to claim 1, comprising:
determining the fresh-air mass parameter in the identified cylinder:

only on a basis of the determined, simplified cylinder load parameter, or additionally on a basis of a steady-state cylinder load parameter determined for steady-state operation.

9. The method according to claim 1, comprising:

determining the diagnosis time window within the low-torque range of the internal combustion engine by determining a time window where a torque of the internal combustion engine is below a torque limit value.

10. An engine control unit configured to:

identify a cylinder which is at an end of an intake stroke or at a beginning of a compression stroke during driving operation of a motor vehicle;

determine a diagnosis time window which lasts for a period of time after closing inlet valves of the identified cylinder within a low-torque range of an internal combustion engine of the motor vehicle;

determine at least two values of a crankshaft speed of the internal combustion engine during the diagnosis time window with a real-time-capable sampling quality;

determine a cylinder load parameter in the identified cylinder in dependence on the determined at least two values of the crankshaft speed;

determine a fresh-air mass parameter in the identified cylinder in dependence on the determined cylinder load parameter; and control a fuel injection quantity for a subsequent operating cycle of the cylinder or a subsequently firing cylinder based on values of the fresh-air mass parameter.

11. The engine control unit according to claim 10, configured to:

evaluate a specific cylinder and use its previously determined air mass in a new operating cycle to determine the fresh-air mass parameter.

12. The engine control unit according to claim 10, configured to:

evaluate a cylinder with regard to its air mass and the value of the fresh-air mass parameter determined at that time and/or determined last is transferred to the next firing cylinder for its feedforward control.

13. The engine control unit according to claim 10, comprising:

a non-volatile memory, wherein the engine control unit is configured to store one or more values of the fresh-air mass parameter determined at one or different diagnosis time windows in the non-volatile memory.

14. The engine control unit according to claim 13, configured to transfer the values of the fresh-air mass parameter stored in the memory to an offboard computer for off-line diagnostic functions.

15. An internal combustion engine comprising:

one or more cylinders; and the engine control unit according to claim 10.

16. The engine control unit according to claim 10, configured to:

determine the diagnosis time window within the low-torque range of the internal combustion engine by determining a time window where a torque of the internal combustion engine is below a torque limit value.

* * * * *